United States Patent [19]

Green

[11] Patent Number: 4,457,325
[45] Date of Patent: * Jul. 3, 1984

[54] SAFETY AND VENTING CAP FOR VEHICLE FUEL TANKS

[75] Inventor: Charles J. Green, Vashon, Wash.

[73] Assignee: GT Development Corporation, Tukwila, Wash.

[*] Notice: The portion of the term of this patent subsequent to Apr. 20, 1999 has been disclaimed.

[21] Appl. No.: 353,489

[22] Filed: Mar. 1, 1982

[51] Int. Cl.³ .......................................... F16K 17/36
[52] U.S. Cl. ..................................... 137/39; 137/43; 137/73; 137/202; 137/331; 220/203; 220/210
[58] Field of Search .............. 220/202, 203, 204, 210; 137/39, 43, 73, 202, 331

[56] References Cited

U.S. PATENT DOCUMENTS

| | | | |
|---|---|---|---|
| 785,594 | 4/1905 | Crispin | 137/202 |
| 1,724,878 | 8/1929 | Jensen | 137/43 |
| 2,271,786 | 2/1942 | Watkins | 137/73 |
| 2,510,098 | 6/1950 | Geisler | 137/43 |
| 2,677,939 | 5/1954 | Clute | 137/202 X |
| 2,919,707 | 1/1960 | Seidler | 137/39 |
| 3,568,695 | 3/1971 | DeFrees | 137/43 |
| 3,662,725 | 5/1972 | Dragon et al. | 137/44 X |
| 3,757,987 | 9/1973 | Marshall | 137/43 X |
| 3,938,692 | 2/1976 | Crute | 137/43 X |
| 3,970,098 | 7/1976 | Boswank et al. | 137/43 X |
| 4,325,398 | 4/1982 | Green | 137/39 |
| 4,390,107 | 6/1983 | Hukuta | 137/43 X |

FOREIGN PATENT DOCUMENTS

| | | | |
|---|---|---|---|
| 1150850 | 6/1963 | Fed. Rep. of Germany | 137/202 |
| 853806 | 11/1938 | France | 137/39 |
| 405385 | 2/1934 | United Kingdom | 137/202 |
| 1400062 | 7/1975 | United Kingdom | 220/204 |

Primary Examiner—Robert G. Nilson
Attorney, Agent, or Firm—Delbert J. Barnard; Joan H. Pauly

[57] ABSTRACT

A fuel tank cap (10,130) having a venting valve (56,56A) adapted to relieve pressure and temperature in the tank and prevent spilling fuel from the tank. A cover plate (28,28A) is automatically (34,34A) removed from the cap by excessive temperature so as to allow fluid in the tank to escape. The valve body (56) has a spin chamber (98), having generally circular cross sections (102,104) and at least one tangentially directed side wall inlet opening (106). The chamber cross sections decrease in diameter upwardly of the inlet opening (88) to a point below a circular outlet opening whereby gas venting through the chamber spins a light weight buoyant ball (94) around the chamber so as to prevent the ball from closing during venting. The ball (94) is lifted onto a seat (92) at the outlet to close it when liquid enters the chamber to a predetermined level. A heavy ball (96) in the chamber holds the light ball (94) on the seat when the chamber has been tilted a predetermined amount. A second heavy ball (90), externally of the chamber in the cap body (30) adjacent the outlet opening (88), moves the light weight ball (94) off the seat when the liquid is below a predetermined level and the chamber is not tilted so that the outlet will be open for venting. Venting occurs through the valve body and through the cap body (30) under the cap cover plate (28) to openings (42) at the periphery of the cap cover plate.

32 Claims, 9 Drawing Figures

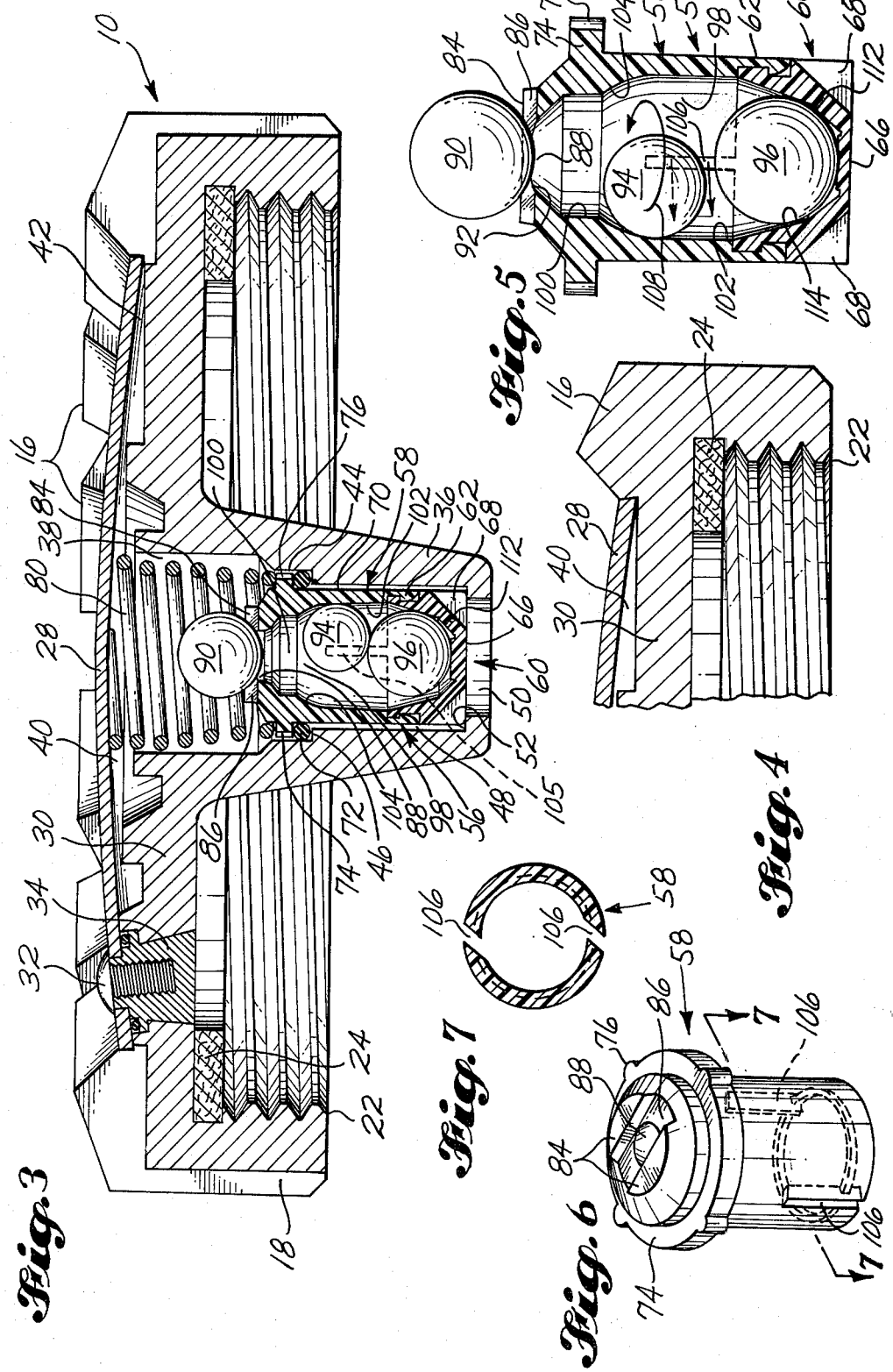

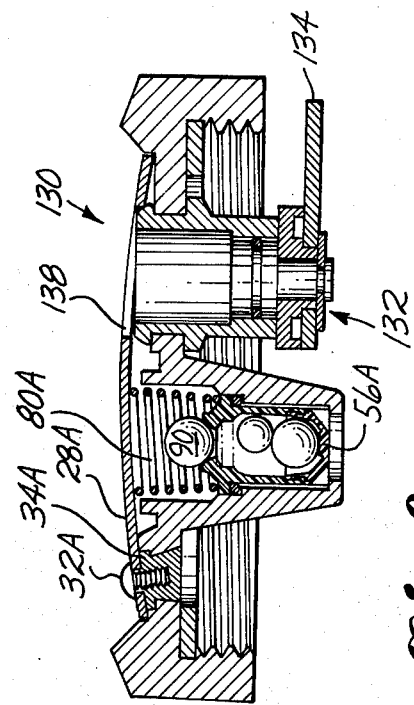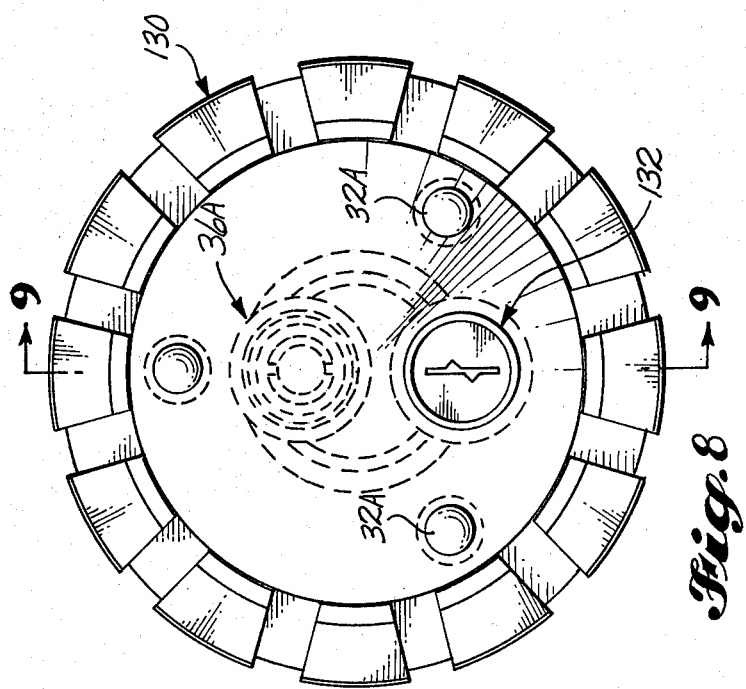

SAFETY AND VENTING CAP FOR VEHICLE FUEL TANKS

CROSS REFERENCE TO RELATED APPLICATION

This application is copending with my application entitled, Safety And Venting Valves For Fuel Tanks Carried On Vehicles, Ser. No. 170,725, filed July 21, 1980 now U.S. Pat. No. 4,325,398.

TECHNICAL FIELD

This invention relates to a safety cap for closing the filling and venting tube on a vehicle fuel tank, the cap being adapted to permit air and fuel vapor flow into or out of the tank and adapted to prevent liquid from escaping in any orientation of the tank from vertical to inverted.

BACKGROUND ART

There is a legal requirement that vent valves on fuel tanks on highway trucks be closable automatically, so that if a truck is tilted or tipped over, there will be no spillage of fuel through the vent valve. It is also necessary that the vent valve be open during normal operation to allow air into the tank as the fuel therein is decreased, and to allow gas to flow out of the tank if the fuel is being increased in the tank. The requirements are the same when the tank and/or the fuel therein contracts or expands. It is also necessary that there be safety releases against excessive pressure and excessive temperature in a fuel tank.

Government regulations require that all fuel tank vent valves be designed to prevent liquid spillage at any attitude of the fuel tank.

In prior art known to applicant and not cited in the related application, a ball valve, although not bouyant, is seated too easily under the influence of gas flowing out of the tank. This occurred because the ball was too close to the seat and the gas pressure activity on the wall around the ball and on the ball was sufficient to seat the valve when it should have remained open. In addition, the non-bouyant ball valve would not always seat when the valve was vertical or when at less than 30 degrees angle of tilt in the presence of liquid fuel. This was due to respective inaction of two other ball elements in the valve.

The French patent to Bloch, U.S. Pat. No. 853,806 presents a ball container within a body, having a bouyant ball normally positioned vertically above a heavy ball. However, there is not adequate chamber in the body for spinning the ball around a central axis of the body nor are there means to cause it to spin. If the bouyant ball in the French patent were held by the liquid to be near the seat, it could easily be seated by gas flow rather than by the liquid.

A U.S. patent to Seidler, U.S. Pat. No. 2,919,707 does not have provision for rotating a bouyant ball and it appears that it would tend to seat too easily under the influence of gas venting from tank.

U.S. Pat. No. 785,594 to Crispin does not provide a space for rotation of the valve nor does it provide means to cause it to rotate. It appears that the Crispin valve is not meant to prevent spillage on tilting because if it were quickly tilted, the liquid could easily flow out of the orifices directly above the ball where the liquid would be closer to the outlet than the ball.

Other references known to the applicant and more remote from the present invention to those described above are:

| | |
|---|---|
| U.S. Pat. No. 3,970,098 | Boswank et al |
| U.S. Pat. No. 3,662,725 | Dragon et al |
| U.S. Pat. No. 1,724,878 | Jensen |
| U.S. Pat. No. 2,677,939 | Clute |
| U.S. Pat. No. 3,757,987 | Marshall |
| U.S. Pat. No. 2,510,098 | Geisler |
| U.S. Pat. No. 3,938,692 | Crute |
| Great Britain No. 405,385 | Price et al |
| German No. 1,150,850 | Bopp et al |

DISCLOSURE OF THE INVENTION

The present invention is a cap for closing a fuel tank filling and venting tube. The cap is adapted to permit air and fuel vapor flow into and out of the tank but adapted to prevent liquid from escaping in any orientation of the tank from vertical to inverted. The cap according to the invention incorporates the safety and venting valve disclosed in the related application.

The cap is constructed to provide an enlarged outlet when pressure in the tank exceeds a predetermined amount. A cap cover plate is secured on the cap by means of fasteners engaged in low melting point inserts which, if the temperature exceeds a predetermined amount, melt and allow the cap cover plate to be automatically removed to open the vent tube fully.

The cap includes a valve within a flow path therethrough to extend generally vertically and which does not shut off venting until the valve body or the flow path axis has been tilted more than 105 degrees.

A bouyant ball valve is operative to seat to close the flow path. It is of very light weight so that it will seal in any position of the valve body when the liquid level in the tank enters the valve body and rises so as to float the ball valve onto the seat. This prevents the tank from overflowing as it is being filled, for example. In the same manner as the tank is tilted and the liquid level rises in the valve body, the sealing valve ball will close the valve as it is floated toward and onto the valve seat.

The sealing bouyant ball is contained within a spin chamber housing into which venting gas is directed tangentially so as to rotate the light weight ball. The spin chamber is generally circular, having diameters decreasing toward the valve seat and this arrangement prevents the sealing ball from seating during normal venting.

The venting passage within the valve housing is relatively large to provide for substantial gaseous flow value in either direction. This is made possible by the spinning arrangement which permits the sealing ball to be spaced a considerable distance from the seat during gaseous outflow and inflow.

A heavy ball in the spin chamber normally rests on the bottom thereof and when the valve body is tilted sufficiently, the heavy ball moves the sealing ball onto the valve seat. This shuts off the venting and prevents spilling of liquid from the tank in the tilt position.

A second heavy ball upwardly of the spin chamber rides on a channel adjacent the outlet thereof but does not seat or seal the outlet because radial flow spacing is provided through the channel. The second heavy ball functions to remove the sealing ball from the seat either by contact through the outlet, or by striking the spin chamber housing with sufficient force. Normal vibration environment during use is adequate to enable the second heavy ball to achieve its unseating function in the event of an undesired or momentary seating of the sealing ball. The sealing ball because of its light weight would remain on the seat if any tendency to vent existed in such a situation; thus the heavy ball is required to remove it from the seat to allow venting to occur. Location of the second heavy ball on the channel results in such ball offering no resistance to the sealing ball as it seats. The channel also results in a larger flow area for venting air around the second heavy ball than in the prior art.

The cap body is made to include a locking device similar to those as may be found in gasoline tank locking caps.

Further objects and advantages of this invention may be brought out in the following part of the specification wherein small details have been described for the competence of disclosure, without intending to limit the scope of the invention which is set forth in the appended claims.

BRIEF DESCRIPTION OF THE DRAWINGS

Referring again to the accompanying drawings, which are for illustrative purposes:

FIG. 3 is a cross-sectional view of a cap according to the invention, taken along the line 3—3 in FIG. 1;

FIG. 4 is a fragmentary cross-sectional view, taken along the line 4—4 in FIG. 1;

FIG. 5 is cross-sectional view of a valve body construction according to the invention, illustrating the operation of a bouyant ball valve during normal venting;

FIG. 6 is a pictorial view of a spin chamber of the valve body;

FIG. 7 is a cross-sectional plan view taken along the line 7—7 in FIG. 6;

FIG. 8 is a plan view of a cap according to the invention and having a lock for securing the cap to a vent tube; and FIG. 9 is a cross-sectional view of a cap having a locking device, taken along the line 9—9 in FIG. 8.

BEST MODE FOR CARRYING OUT THE INVENTION

Figure 1:
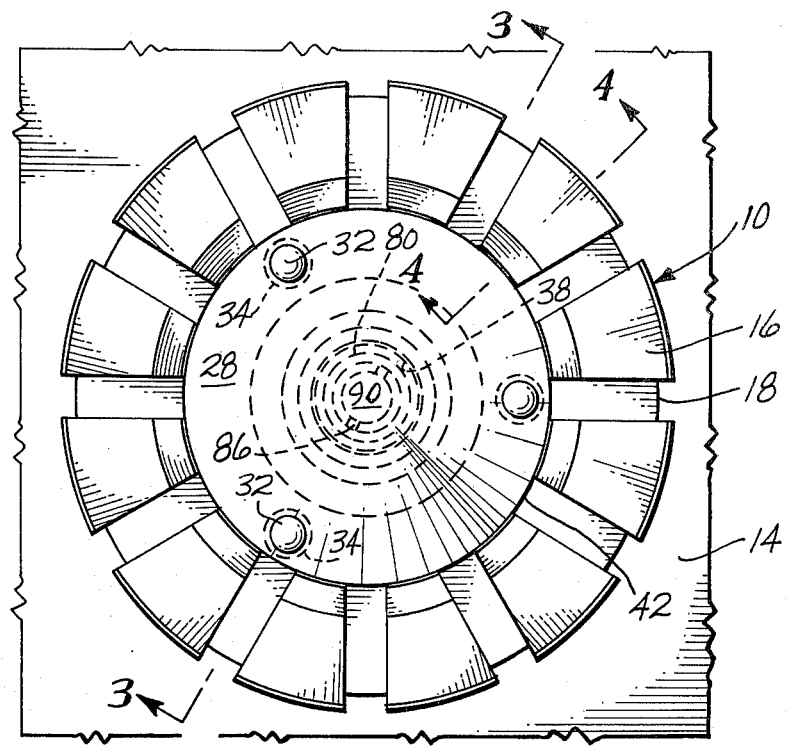
FIG. 1 is a plan view of a cap for closing a fuel tank filling and venting tube, in accordance with the invention.

Referring again to the drawings, in FIGS. 1-4, there is shown a cap 10 for closing a fuel tank filling and venting tube 12 extending outwardly from a tank 14. The cap has large annularly spaced gripping serrations or lugs 16 extending radially from a generally cylindrical cap body 18.

As shown in FIG. 3, the underside of the cap has a tapped bore 22 for securing to external threads, not shown, on the tube 12. Inwardly of the threads is an annular gasket 24 for sealing along the upper outer edge, not shown, of the tube.

Inwardly of the inner ends of the lugs 16 is a centrally positioned convex circular cover plate 28 secured to a cap body portion 30 by screws or fettered drive pins 32. The fasteners 32 are secured in low melting point, generally frusto-conical inserts 34. The inserts 34 are adapted to melt at 255 degrees F., for example, and are formed in the body 30 as a liquid. When cooled, they solidify and are secure in place because of their frusto-conical configuration.

Centrally within the body portion is a tubular member 36 forming a tank venting flow path comprised of a large diameter cylindrical portion 38, opened to the top of the body portion and to flow areas 40 within the body portion 30 and the plate cover 28. The flow area 40 is in communication with the atmosphere through flow paths 42 extending between the lugs 16 and under the cover plate.

Axially inwardly of the passage portion 38 is a countersunk cylindrical bore 44, terminating in an annular shoulder 46 and inwardly thereof is a smaller diameter passage 48 which is in communication with inner small diameter portion 50, open to the tube 12 and the tank 14. Inwardly of the passage portion 50 is an annular radially directed shoulder 52.

A two-part valve body 56, FIGS. 3 and 5-7, is positioned within the bores 44 and 48 of the tubular member 36. It is comprised of a generally cylindrical part 58, FIG. 6, and a lower part 60, the parts being snap-fit together by means of alternate lands and grooves at 62. The valve body parts are made of a resilient plastic which makes the snap-fit possible. The plastic is relatively inert so as to not to be affected by the liquid in the tank. The lower part 60 has a small diameter external bottom 66, from which extends four radially-directed spaced legs 68, supported upon the annular shoulder 52.

An annular passage 70 is formed between the valve body and the cylindrical surface of the bore 48. The passage 50 connects the tube and tank to the passage 70, normally sealed at its upper end by an O-ring 72 on the annular shoulder 46. An annular flange 74, FIG. 6, extending radially outwardly from the valve body part 58 is normally sealingly engaged with the O-ring 72 to close the upper end of the passage 70. Four protuberances 76, annularly spaced on the circumference of the flange 74, space the valve body within the cylindrical bore 44.

A coil spring 80 has its upper end in abutment with the inner concave surface of the cap cover 28 and has its lower end in abutment with the upper surface of the flange 74 to hold the valve body in a sealing position with respect to the passage 70 to a tank pressure of from 10 to 25 PSIG., for example. The upper valve body portion 58 has an upper and outer pair of spaced surfaces 84, FIG. 6, interrupted by a diametrically extending, substantially rectangular channel 86. The channel base is interrupted by an axially directed circular opening 88, forming an outlet for the upper portion of the valve body. A heavy ball 90 is positioned to roll, on channel 86 within the spring 80, as a result of the slightest tilt of the valve body. The channel 86 is narrow enough to prevent the ball 90 from extending downwardly far enough to seat on the opening 88.

At the inner end of the outlet 88, a valve seat 92 is formed to receive a light weight bouyant ball valve 94 to close the outlet 88, FIGS. 3 and 5. In a static position, the ball 94 rests on a lower heavy ball 96 of the same size and weight of the ball 90. The heavy balls are stainless steel and have diameters of 5/16 inch, for example.

The upper valve body portion 58 has a substantially axially, elongated hollow spin chamber 98 formed of non-uniform circular cross sections. Inwardly of the seat 92 is a cylindrical wall surface 100 having a diameter large enough to permit the ball 94 to move therethrough so as to move easily onto the smaller diameter seat 92. An outwardly decreasing, diameter portion starts at 102 and continues into a restraining wall portion 104, terminating in the cylindrical portion 100. The wall portion starting at 102 and terminating at 104 is effective during venting operations to be explained.

As shown in FIGS. 3 and 5-7, there are two diametrically opposed, tangentially directed slots 106 through the wall of the upper valve body part 58 so as to connect the valve with the tank through the passages 50 and 70. Venting flow out of the tank and into the hollow chamber 98 through the tangential slots 106 causes the light weight ball 94 to spin around the chamber wall, as indicated in FIG. 5 by the circularly directed arrow 108.

Most venting occurs during vehicle operation when fuel and entrained gases are returned from the engine to the tank. Venting also occurs when the tank is being filled and during expansion of the liquid when its temperature is raised. The ball 94 is ¼ inch in diameter, for example, and may be made of polypropylene. It is so light in weight that it would be easily moved upwardly to seat at 92 by the slightest venting flow if it were not for the configuration of the interior of the valve body part between 102 and 104 and the tangential flow through the slots 106. Thus the ball 94 is caused to spin, as indicated by the arrow 108, at relatively high velocity around the interior of the valve body. The gas flow moves the ball upwardly along the converging surface between 102 and 104. Therefore, as the ball rises it spins at a faster rate because it is forced radially inwardly by the decreasing diameters.

The configuration of the wall, particularly at 104, imparts a downwardly component to the centrifugal force on the ball and prevents it from moving onto the seat 92 during normal venting of the tank. Stated differently, the rotation of the ball 94 against the smaller diameter portions of the wall increases the centripetal force on the ball to cause it to continue to rotate relatively toward the center of the chamber, and thus prevents it from moving upwardly toward the seat.

As shown in my cross-referenced application, if fuel rises in the vent for any reason, to a predetermined level upwardly through the passages 50 and 70, and into the chamber 98, the bouyant ball 94 is moved onto the seat 92. This action will prevent spillage to the extent that the valve will hold the pressure induced by the excessive liquid.

The seating of the ball 94 by being floated by the liquid is most important under situations where the tank is tilted and the liquid is not increased within the tank, but rises with respect to the position of the tilted valve. Thus, the tilting is prevented from causing spillage. A drain opening 112 is provided through the bottom part 60 of the valve body to allow the liquid to drain therefrom when the level in the tank is lowered so as to be below the valve 56.

When the bouyant force is removed from the ball 94, the heavy ball 90, which moves freely in the channel 86, back and forth against the spring 80 at the slightest motion of the tank, moves from a position out of register with the opening 88 across the opening so as to move the light weight ball 94 off the seat and cause it to resume its position against the ball 96, FIG. 3, if the tank is not venting or if the air is flowing into the tank from the exterior. When the liquid level rises and the valve is substantially vertical, the light weight ball 94 moves onto the seat and in so moving moves the ball 90 away from the opening, the ball 90 offering essentially no resistance to such movement. The only function of the ball 90 is to force the light weight ball 94 off the seat after the liquid level is lowered with respect to the ball 94. The action of the ball 90 is necessary because any gas pressure in the chamber 98 or any flow of gas therein will hold the light weight ball on the seat after the liquid is lowered.

As shown in FIG. 3, when the valve is generally vertical, the ball 96 is seated on the bottom of the interior surface of the part 60 of the valve body. In this position, an upper portion of the ball is in tangential engagement with conical internal wall surface 114, inclined upwardly and outwardly. The angle of the surface 114 is about 70 degrees with the horizontal. This allows substantial tilting of the tank and valve before the ball 96 is caused to roll on the surface 114 toward the outlet 88 of the valve body portion 58. As shown in my cross-referenced application, the valve is constructed to permit its venting function even when the fuel tank is tilted substantially. The venting is stopped on tilt only when the ball 96 moves the ball 94 onto the seat or when the liquid level in the valve body causes the ball to move onto the seat. The ball 96 does not move axially within the housing until the wall 114 dips below the horizontal position. Because of its inclination, the surface 114 does not reach a horizontal position until the angle of tilt is above 75 degrees. The ball 96 moves along that surface until it moves onto the surface 102, where if tilting stops, the ball should come to a position of rest until further tilting occurs. When it does, it rolls along the surface at 102 a sufficient distance to push the ball 94 onto the seat into a sealing relationship. This stops the venting of the tank and also prevents any spillage of the liquid because of the tilt, if the valve has not already sealed due to the presence of the liquid.

As shown in FIG. 3, the flow passage, for venting and for inlet of air into the tank through the valve body outlet 88, extends through the large diameter bore 38 to the passage area 40 and through the multiple passages 42 between the lugs 16.

When the pressure in the tank exceeds the stored energy force of the spring 80, the valve body 56 is lifted, pressure being exerted on the external surfaces thereof including the under side of the flange 74, which operates against the spring 80. When the flange 74 is lifted off the O-ring 72, the tank pressure is released directly through the annular passage 44 into the bore 38, the area 40 and the outlets 42 to the atmosphere.

When the temperature of the inserts 34 in the cap body 30 exceeds their melting point which is typically 255 degrees F. for such installations, the inserts disintegrate and the spring 80 lifts the plate cover 28 off of the cap body so that gas or liquid can be discharged from the tank rather than have the tank explode. Under such conditions, the valve body 56 would typically be blown out of the cap.

Figure 2:
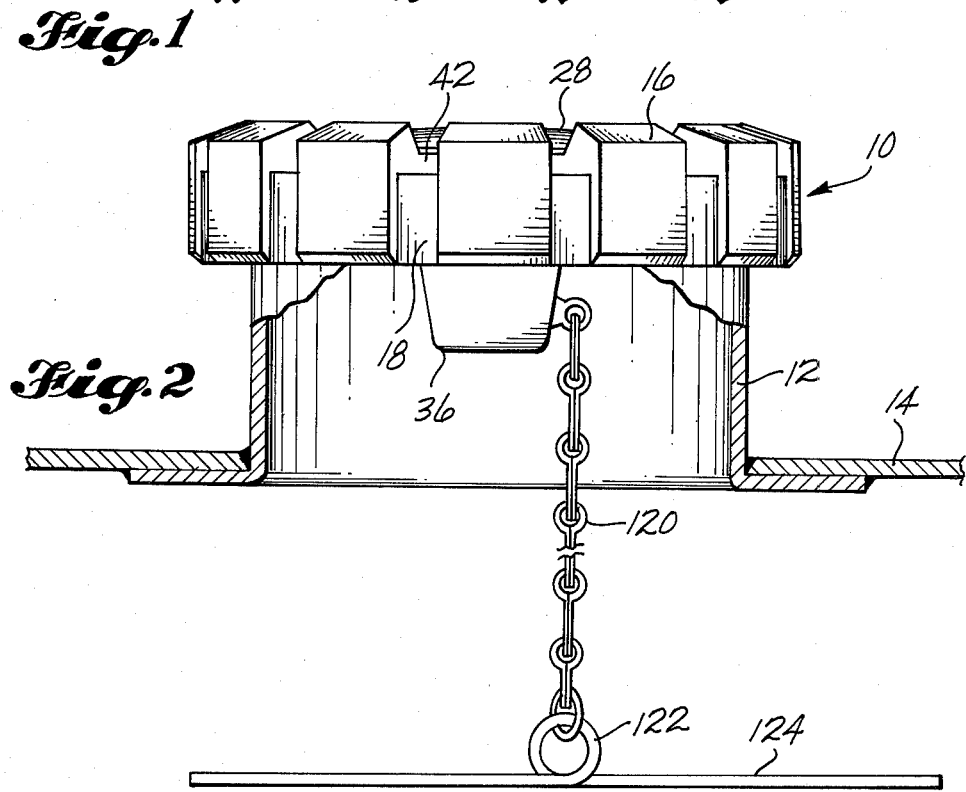
FIG. 2 is a side elevational view of the cap shown in FIG. 1, positioned on a filling and venting tube of a vehicle fuel tank.

In summary, the cap 10 is shown in FIG. 2 in its normal vertical position secured on the top of a fuel tank filling and venting tube adjacent the top of a tank carried on a motor vehicle. In the position shown in FIG. 2, the valve is as shown in FIG. 3.

As shown in FIG. 2, there is a chain 120 attached to hang from the tubular member 36 into the tank 14 and on the lower end of the chain there is a loop 122 on a rod 124. The rod 124 is longer than the diameter of the tube 12 so as to normally keep the cap 10 secured to the tank when it is disengaged from the tube 12 for filling the tank. This arrangement allows the cap to hang down alongside the tube while it is secured within the tank by the rod.

In FIGS. 8 and 9 there is a cap 130 which is substantially the same as the cap 10 in FIGS. 1-7. The primary difference is the addition of a lock 132 to lock the cap to the filling tube and tank. When it is secured in place, the locking lever 134 is rotated by the key to extend into a notch in the inner wall of the filling tube.

In order to insert the lock in the cap structure, a tubular member 36A, the full equivalent of the tubular member 36 in FIG. 3, must be positioned off center. The tubular member 36A has the same bores to receive a spring 80A and a valve body member 56A as the spring 80 and the valve body 56 in FIG. 3. Similarly, a cap cover plate 28A is secured to the cap by means of fasteners 32A in low melting point inserts 34A. The cap cover plate is different from that shown in FIG. 3 only to the extent of the requirement of an opening 138 to permit access to the lock.

The valve body 56A is rotated 90 degrees from that shown in FIG. 3 and the position of the upper heavy ball 90 in the channel is shown so as to illustrate the distance of the ball from the seat 92 for the ball 94.

The invention and its attendant advantages will be understood from the foregoing description and it will be apparent that various changes may be made in the form, construction, and arrangement of the parts of the invention without departing from the spirit and scope thereof or sacrificing its material advantages, the arrangements hereinbefore described being merely by way of example. I do not wish to be restricted to the specific forms shown or use mentioned except as defined in the accompanying claims.

I claim:

1. A cap for closing a fuel tank filling and venting tube, said cap being adapted to permit air and fuel vapor flow into or out of the tank but adapted to prevent liquid from escaping in any orientation of the tank from vertical to inverted, said cap comprising:
   a cap body;
   means associated with the cap body to secure it to the tube for closing;
   a cap cover plate secured to the cap body and adapted to extend across a portion of the cap in a direction generally transverse to the axis of the tube;
   means in said cap body defining a vent passageway having an inlet end adapted to extend into the tube and having an outlet adapted to extend outwardly of the tube;
   a body passage connecting the exterior of the body with the outlet of the vent passageway;
   means defining an outlet orifice in said vent passageway bounded by a downwardly directed ball seat;
   a light weight buoyant closure ball in said passageway below said ball seat, larger in diameter than said ball seat and adapted to float upwardly into seating engagement with the ball seat in response to liquid movement into said passageway;
   flow directing means for gases venting through said passageway, for creating swirling gas currents during venting which act to spin said buoyant ball and dynamically influence it away from said ball seat, and
   a heavy ball in said passageway below said light weight buoyant ball, adapted to move by gravity against said light weight ball, and force said light weight buoyant ball onto said seat in response to a tilting of the passageway beyond a predetermined amount.

2. A cap for closing a fuel tank filling and venting tube, said cap being adapted to permit air and fuel vapor flow into or out of the tank but adapted to prevent liquid from escaping in any orientation of the tank from vertical to inverted, said cap comprising:
   a cap body;
   means associated with the cap body to secure it to the tube for closing;
   a cap cover plate secured to the cap body and adapted to extend across a portion of the cap in a direction generally transverse to the axis of the tube;
   means in said cap body defining a vent passageway having an inlet portion adapted to extend into the tube and having an outlet adapted to extend outwardly of the tube;
   a body passage connecting the exterior of the body with said outlet of the vent passageway adjacent said cap cover plate;
   said vent passageway having wall means defining a chamber having internal generally circular cross sections;
   at least one sidewall inlet opening into said chamber adjacent said inlet portion, said inlet opening including means to direct gas flow therethrough and into said chamber generally along the surface of said circular cross sections;
   a circular outlet opening at an end of said chamber inwardly of and connected to said outlet, axially outwardly of and away from said inlet opening;
   a light weight buoyant ball in said chamber, said ball having a larger diameter than said outlet opening; and
   means defining said chamber cross sections to prevent said light weight ball from seating in said outlet opening when gas is flowing through the chamber, whereby gas through the chamber will move the light weight ball around the chamber;
   said light weight ball being adapted to be lifted to seat on said outlet opening when liquid enters said chamber to a predetermined level to close said outlet opening.

3. The invention according to claim 2 in which:
   said means defining said chamber cross sections include cross sections decreasing in area away from said inlet opening toward and adjacent said outlet opening so that as the diameters become smaller the movement of the ball becomes faster to create a centripetal force having a downwardly directed component, which during normal venting, prevents the ball from moving toward the seat on said outlet opening.

4. The invention according to claim 2 in which:
   said means of said inlet opening to direct gas flow along the surface of said circular cross sections includes said inlet opening being slot-shaped, the slot being elongated in the general direction of an axis through the centers of said circuit cross sections.

5. The invention according to claims 1 or 2 including:
   means associated with said vent passageway to provide additional passage area to the outlet when the pressure in the vent passageway exceeds a predetermined amount.

6. The invention accordiing to claim 1 or 2 including:

means associated with the body passage to substantially increase the outlet area when the temperature in the outlet exceeds a predetermined amount.

7. The invention according to claim 6 in which:
said means associated with the body passage include a plurality of low melting point body inserts adapted to melt when the temperature exceeds said predetermined amount;
said cap cover being secured to said cap body by screws threadedly engaged in said inserts, said screws being adapted to be disengaged when said inserts melt.

8. The invention according to claims 1 or 2 in which:
said body passage including a plurality of passages extending outwardly from said outlet generally along the inner side of the cover plate.

9. The invention according to claims 1 or 2 in which:
a locking device for locking said cap on said tube when said cap is secured on said tube,
said locking device extending inwardly into said body and spaced from said vent passageway, adapted to make locking engagement within the tube.

10. A cap for closing a fuel tank filling and venting tube, said cap being adapted to permit air and fuel vapor flow into or out of the tank but adapted to prevent liquid to escape in any orientation of the tank from vertical to inverted, said cap comprising
a cap body;
means associated with the cap body to secure it to the tube for closing;
a cap cover plate secured to the cap body and adapted to extend across a portion of the cap in a direction generally transverse to the axis of the tube;
means in said cop body defining a gas venting valve having a valve body, a valve inlet portion adapted to extend into the tube and having an outlet portion adapted to extend outwardly of the tube;
a cap body passage connecting the exterior of the cap body with said outlet portion adjacent said cap cover plate;
said valve inlet portion having a valve inlet; a valve outlet joining said outlet portion;
a flow passage between said valve inlet and said valve outlet in said valve body;
a circular valve seat in said valve body adjacent said valve outlet;
a chamber in said valve body adjacent said valve outlet and formed by a valve body wall;
a light weight buoyant ball in said chamber to close the flow passage and valve outlet at the seat when liquid enters the passage to a predetermined level;
flow means in said passage and said chamber to prevent the ball from seating and closing the passage when gas is being vented, said flow means including said valve inlet being through said valve body wall into said chamber to direct gas flow along an inner surface of said chamber and to move said ball generally along said surface;
said flow means further including means defining said chamber between said valve inlet and adjacent means defining said chamber between said valve inlet and adjacent said seat to prevent the ball from seating when the gas is flowing and moving the ball along the said surface.

11. The invention according to claim 10 in which:
said means defining said chamber between said valve inlet and adjacent said seat are circular cross sections decreasing in areas away from said valve inlet and toward and adjacent said valve outlet so that as the diameters become smaller the movement of the ball becomes faster to create a centripetal force having a downwardly directed component, which during normal venting, prevents the ball from moving toward the seat.

12. The invention according to claim 11 in which:
said valve inlet is elongated in the general direction of an axis through the circular cross sections.

13. The invention according to claim 11 in which:
said valve inlet is directed generally tangentially along surfaces of said circular cross sections.

14. The invention according to claim 10 including:
a first member in said chamber to hold said light weight ball to close the passage after the valve body is tilted a predetermined amount.

15. The invention according to claim 10 including:
a second member associated with said passage to move said light weight ball from closing the passage when the liquid is below a predetermined level and the valve body is not tilted, so that the passage will be open for venting.

16. The invention according to claim 10 is which:
said flow passage is normally open.

17. The invention according to claim 10 including:
means associated with said passage to provide additional passage area to the outlet portion when the pressure in the passage exceeds a predetermined amount.

18. The invention according to claim 10 including:
means associated with said passage to substantially increase the outlet portion area when the temperature in the passage exceeds a predetermined amount.

19. The invention according to claim 14 in which:
said chamber has a passage portion in which said light weight ball may move toward and away from said seat;
said passage portion being elongated generally vertically when said valve body is positioned generally vertically and not tilted significantly;
a bottom surface of said chamber;
an upwardly and outwardly inclining internal surface extending from adjacent said bottom;
said first member being a heavy ball resting on said bottom when said valve body is tilted significantly;
said light weight ball being between said first member and said seat when the light weight ball is not seated;
said first member being adapted to move on said inclining surface to move the light weight ball onto the seat when the valve body is tilted from said generally vertical position to a position past the horizontal.

20. The invention according to claim 19 including:
a liquid drain opening adjacent the bottom of said chamber.

21. A cap for closing a fuel tank filling and venting tube, said cap being adapted to permit air and fuel vapor flow into or onto the tank but adapted to prevent liquid to escape in any orientation of the tank from vertical to inverted, said cap comprising:
a cap body;
means associated with the cap body to secure it to the tube for closing;
a cap cover plate secured to the cap body and adapted to extend across a portion of the cap in a direction generally transverse to the axis of the tube;

a venting passage in said body having an inlet portion and an outlet portion, the inlet portion being adapted to extend into the tube and the outlet portion being adapted to extend outwardly of the tube;

a cap body passage connecting the exterior of the cap body with the outlet portion adjacent the cap cover plate;

a gas venting valve in said venting passage, said valve having a valve body, a valve inlet, and a valve outlet;

said valve inlet being connected to said passage inlet portion and said valve outlet being connected to said outlet portion;

a flow path between said valve inlet and said valve outlet in said valve body; said path being a part of the venting passage;

a valve member in the valve body operative in said flow path to close the path and passage when liquid enters the passage to a predetermined level;

flow means in said flow path to prevent the valve member from closing the path and passage when the valve is venting gas;

said flow means including at least one valve inlet; and a valve seat in said valve body extending around said valve outlet;

said valve member being in a sealing relationship on said seat when it closes said passage;

said valve body having a hollow portion in which said valve member may move toward and away from said seat;

said hollow portion being elongated, generally vertically when said valve body is positioned generally vertically and not tilted significantly;

said valve body having a wall surrounding said hollow portion;

said flow means further including said valve inlet being directed tangentially into said hollow portion;

said valve outlet and said seat being above said valve inlet.

22. A cap for closing a fuel tank filling and venting tube, said cap being adapted to permit air and fuel vapor flow into or out of the tank but adapted to prevent liquid from escaping in any orientation of the tank from vertical to inverted, said cap comprising;

a cap body;

means associated with the cap body to secure it to the tube for closing;

a cap cover plate secured to the cap body and adapted to extend across a portion of the cap in a direction generally transverse to the axis of the tube;

a venting passage in said body having an inlet portion and an outlet portion, the inlet portion being adapted to extend into the tube and the outlet portion being adapted to extend outwardly of the tube;

a cap body passage connecting the exterior of the cap body with the outlet portion adjacent the cap cover plate;

wall means defining a spin chamber in said venting passage;

said chamber having an outlet connected to said outlet portion and an inlet connected to said inlet portion, said chamber having internal generally circular cross sections;

said outlet being a circular opening at a normally upper end of said chamber;

a closure ball in said chamber, said ball having a larger diameter than said outlet opening;

at least one side wall inlet opening into said chamber being tangentially directed with respect to said chamber cross sections, whereby gas through the spin chamber will spin the closure ball around the chamber; and liquid flow response force means acting on said ball, for lifting said ball to seat on said outlet opening when liquid enters said chamber to a predetermined level, to in that manner close said outlet opening and block liquid flow out through the outlet opening.

23. The invention according to claim 22, wherein said closure ball is light weight and buoyant and such buoyancy provides the liquid response force means which functions when liquid enters the chamber to seat the closure ball.

24. The invention according to claim 21 including:

a second member in said passage to hold said valve member to close the passage after the valve body is tilted a predetermined amount;

said flow means further including said valve inlet being slot-shaped through said wall.

25. The invention according to claim 21 in which:

said valve member is buoyant in said liquid so that liquid entering said housing lifts said valve member to sit on said seat in a sealing relationship at said predetermined level.

26. The invention according to claim 21 in which:

said valve member is positioned in the way of said valve inlet when it is off the seat;

said valve member being sufficiently light in weight so as to be movable around said valve body by gas being vented through said flow passage.

27. The invention according to claim 21 in which:

said wall having internal surfaces of non-uniform cross sections defining said hollow portion;

said flow means further including said cross sections decreasing in area above said inlet toward and below said seat.

28. The invention according to claim 21 in which:

said wall having internal surfaces of non-uniform, generally circular cross sections defining said hollow portions;

said valve member being a ball;

said flow means further including said cross sections decreasing in area above said valve inlet toward and adjacent said seat so that as the diameters become smaller the movement of the ball becomes faster to create a centripetal force having a downwardly directed component, which during normal venting, prevents the ball from moving upwardly into a seated position.

29. The invention according to claim 23 including:

a heavy ball in said chamber to hold said light weight ball on said seat when the chamber has been tilted a predetermined amount.

30. The invention according to claim 23 including:

a heavy ball externally of said chamber adjacent said outlet opening adapted to move said light weight ball off said seat when the liquid is below a predetermined level and the chamber is not tilted, so that the outlet will be open for venting.

31. The invention according to claim 23 in which:

said inlet opening is slot-shaped;

said chamber cross sections including said cross sections decreasing in area above said inlet opening toward the adjacent said seat so that as the diameters become smaller the spinning of the ball becomes faster to impart a a downwardly directed component to the centrifugal force on the light weight ball, which during normal venting, prevents the light weight ball from moving upwardly into a seated position.

32. The invention according to claim 23 including:
a bottom surface of said chamber;
an upwardly and outwardly inclining internal surface extending from adjacent said bottom;
a heavy ball resting on said bottom when said chamber is not tilted;
said light weight ball being between said heavy ball and said outlet opening;
said heavy ball being adapted to move on said inclining surface to move the light weight ball to be seated on the outlet opening when the chamber is tilted from a generally vertical position to a position past the horizontal.

* * * * *

UNITED STATES PATENT AND TRADEMARK OFFICE
CERTIFICATE OF CORRECTION

PATENT NO. : 4,457,325
DATED : July 3, 1984
INVENTOR(S) : Charles J. Green

It is certified that error appears in the above-identified patent and that said Letters Patent are hereby corrected as shown below:     Title page:

In the 10th line of the Abstract, "(88)" should be deleted.

In the 11th line of the Abstract, --(88)-- should be inserted following "opening".

Column 2, line 53, "value" should be --volume--.

Column 8, line 61, "circuit" should be --circular--.

Column 9, line 26, "to escape" should be --from escaping--.

Column 9, line 35, "cop" should be --cap--.

Column 10, line 24, "is" should be --in--.

Column 10, line 62, "onto" should be --out from--.

Column 10, line 63, "to escape" should be --from escaping--.

Column 13, line 5, "a", second occurrence, should be deleted.

Column 1, lines 38, 50-51, 55, and 59; column 2, lines 35 and 44; column 3, line 38; column 4, line 58; and column 5, lines 44 and 57, "bouyant" should be --buoyant--.

Column 1, line 44, "non-bouyant" should be --non-buoyant--.

Signed and Sealed this

Twenty-eighth Day of May 1985

[SEAL]

Attest:

DONALD J. QUIGG

Attesting Officer    Acting Commissioner of Patents and Trademarks